H. HILL.
METAL WHEEL.
APPLICATION FILED OCT. 7, 1911.
1,083,682.
Patented Jan. 6, 1914.
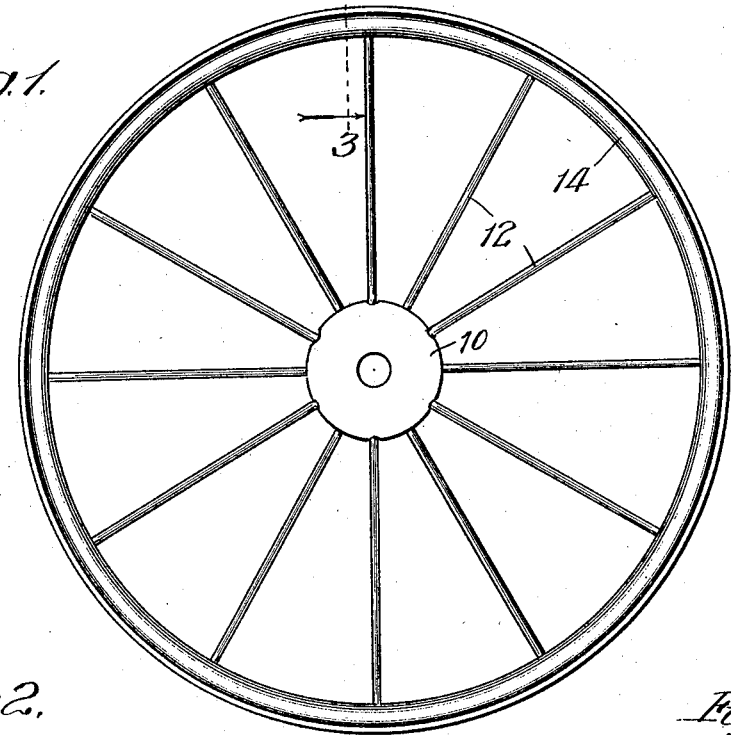
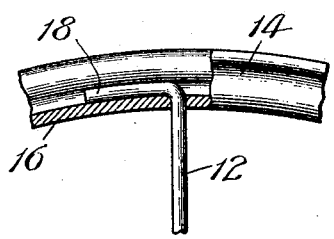
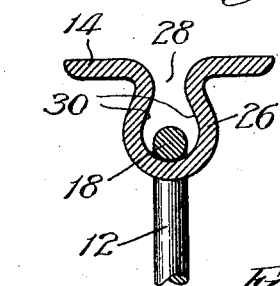
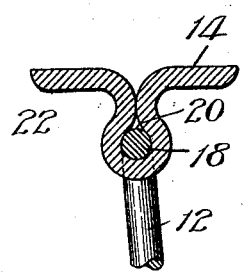
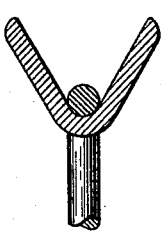
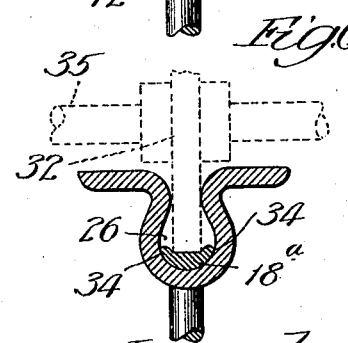
Witnesses:
Inventor:
Hugh Hill,
By Cheever + Cox
Attys.

UNITED STATES PATENT OFFICE.

HUGH HILL, OF ANDERSON, INDIANA.

METAL WHEEL.

1,083,682. Specification of Letters Patent. Patented Jan. 6, 1914.

Application filed October 7, 1911. Serial No. 653,296.

*To all whom it may concern:*

Be it known that I, HUGH HILL, a citizen of the United States, residing at Anderson, in the county of Madison and State of Indiana, have invented a certain new and useful Improvement in Metal Wheels, of which the following is a specification.

This invention relates to the securing of metal spokes to the rims of wheels.

The object of the invention is to cheapen the manufacture of the wheel, while maintaining full strength and utility.

The invention consists in the novel method of attaching the outer ends of the metallic spokes to the rim of the wheels, doing away with the ordinary riveting heretofore used, and greatly simplifying the operation.

Figure 1 is a side view of a wheel of the type referred to illustrating the preferred form of this invention. Fig. 2 is a sectional detail view of a portion of the rim of a wheel showing the preferred form of attaching the spoke to the rim under this invention. Fig. 3 is a sectional detail view on the line 3 of Fig. 1, showing the preferred method of securing the end of the spoke to the rim of the wheel. Fig. 4 is a sectional detail view of a rim and spoke. Figs. 5 and 6 are sectional detail views corresponding to the view on the line 3 of Fig. 1, showing successive steps in the operation of attaching the spoke to the rim by a third form of this invention.

The wheel shown in Fig. 1 is the ordinary wheel comprising the hub 10, the spokes 12 and rim 14.

In the form of the device illustrated in Fig. 2 each spoke 12 is inserted through a hole in the bottom 16 of the rim 14 much in the same manner as if the end were to be riveted to the rim. Instead of being riveted the end 18 is simply bent over in contact with the bottom 16 of the rim, or into the position shown in Figs. 2, 3 and 4. The stiffness of the material of the spoke 12 is sufficient in light service wheels to prevent the rebending of the end 18 of the spoke sufficiently to release the spoke from the rim. The operation of thus bending the end of the spoke to the position shown in Figs. 2, 3 and 4 can be performed in the operation of making the wheel by the travel of a compressing wheel, such as is shown in dotted lines in Fig. 6, thus doing away with the stopping of the wheel of Fig. 1 at each successive spoke so as to rivet the end of each spoke, as has heretofore been practised.

Where wheels carrying more load are used it is necessary to provide some means for securing the end 18 of the spoke against the force tending to bend it upward or to straighten it out and allow the spoke end to escape from the rim. In the preferred form of the device this is accomplished by providing the bottom of the rim 14 with an annular trough 20 bent, as shown in Fig. 3, so as to closely inclose the end 18 of the spoke and resist any upward bending action placed upon the spoke end. It will be noticed in Fig. 3 that the upper portion of the walls of this trough, as viewed in Fig. 3, closely inclose the spoke end 18 for more than half its circumference and that the inner walls 22 of the trough above the spoke may abut or may be separated from each other a distance less than the diameter of the spoke end 18. The result of this is that the end 18 of the spoke cannot move in any direction from the position of Fig. 3 without forcibly separating these walls 22 of the trough 20 a distance apart at least that of the diameter of the spoke end 18.

A less expensive method of manufacture of the preferred form of the manner for securing metal spokes to the rims of wheels is illustrated in finished form in Fig. 6. In this form of device a trough 26 resembling trough 20 of Fig. 3 is formed upon the surface of the rim 14 but instead of being closed, as shown in Fig. 3, over the spoke end 18 it is left with a passageway 28 in the rim at least equal in width to the outside diameter of the spoke end 18 while the lower inner walls 30 of the trough are a substantially greater distance apart, as appears in Figs. 5 and 6. In making this form of the device the spoke 12 with the end 18 in alinement therewith is inserted in a hole provided therefor in the bottom of the trough 26 and can pass upward through the space 28 heretofore referred to. When each spoke of the wheel has been thus placed in position the wheel of Fig. 1 is placed in a machine adapted to rotate it under a compression wheel or former 32 preferably mounted on a shaft 35, as shown in dotted lines in Fig. 6, with the result that each spoke end 18 is successively first bent down into the trough and then mashed or compressed so as to increase the width of spoke end 18 approximately at 18ª in Fig. 6, so that the outer edges 34 of the spoke end 18ª of Fig. 6 contacts with the widest portions of the interior of the trough, thus securing the spoke rigidly to the rim.

The form of the device shown in Figs. 5 and 6 is less expensive to manufacture than the form illustrated in Fig. 3 for the reason that it is a much more simple method of manufacture as it is not necessary to compress the upper portions of the walls of the trough together after the spoke end is in place.

The claims are:—

1. A wheel comprising a single rim, a hub and spokes radiating therefrom, the ends of the spokes being inserted through the rim and bent outside the rim through substantially a right angle into contact with the surface of the rim, and means forming a part of said single rim engaging the turned spoke ends to rigidly hold them in the rim, for the purposes set forth.

2. A wheel comprising a rim containing a trough shaped recess extending around its surface, a hub inside the rim and spokes radiating from the hub secured to the rim by passing through the rim, the ends of the spokes being bent through approximately a right angle into the bottom of said trough of the rim and held in that position by being engaged by the walls of the trough which are bent in toward each other until they are closer together than the diameter of the spoke ends.

3. A wheel containing metallic spokes, and a rim, in which the spokes are secured to the rim by the end of each spoke being bent at approximately right angles to the spoke into a trough like recess formed in the rim, and the walls of said trough then bent together over the end of the spoke until they are closer together than the width of the spoke ends, for the purpose set forth.

4. A wheel comprising a rim containing a partially closed recess extending around its surface, a hub inside the rim and spokes radiating from the hub secured to the rim by passing through the rim, the ends of the spokes being bent through approximately right angles in the bottom of said partially closed recess in rim and held in position by ends of spokes being then spread to contact with walls of said partially closed recess which has a smaller opening than the width of the expanded spoke ends, for the purpose set forth.

5. A wheel comprising metallic spokes and a rim, having oppositely outwardly extending side edges, in which the spokes are secured to the rim by the end of each spoke passing through the rim and being then bent at approximately a right angle to itself into a troughlike recess formed in the rim near its middle and the walls of said trough, intermediate between the edges of the rim being then bent together over the turned ends of the spokes until said walls are closer together than the widths of the spokes for the purposes set forth.

6. A wheel containing metallic spokes and a rim, the latter being made from a single strip of metal having parallel, non-contacting, outer edges, in which the spokes are secured to the rim by the end of each spoke passing through the rim and being then bent at approximately a right angle to itself into a troughlike recess formed in the rim intermediate between its side edges, and the walls of said trough adjacent to the turned spoke ends being then bent together over the ends of the spokes until said walls are closer together than the widths of the spoke ends for the purposes set forth.

In witness whereof, I have hereunto subscribed my name in the presence of two witnesses.

HUGH HILL.

Witnesses:
MABEL K. MILLSPAUGH,
JAMES M. STARR.

---

Copies of this patent may be obtained for five cents each, by addressing the "Commissioner of Patents, Washington, D. C."